United States Patent
Krounbi et al.

[11] Patent Number: 5,926,349
[45] Date of Patent: Jul. 20, 1999

[54] SIMPLIFIED MAGNETIC HEAD WITH COMMON WRITE GAP/FIRST INSULATION LAYER

[75] Inventors: Mohamad Towfik Krounbi; James Hsi-Tang Lee, both of San Jose, Calif.

[73] Assignee: International Business Machines Corporation, Armonk, N.Y.

[21] Appl. No.: 08/919,738

[22] Filed: Aug. 28, 1997

Related U.S. Application Data

[62] Division of application No. 08/474,645, Jun. 7, 1995, Pat. No. 5,779,923, which is a division of application No. 08/205,006, Mar. 2, 1994, Pat. No. 5,435,053.

[51] Int. Cl.⁶ .................................................. G11B 5/127
[52] U.S. Cl. ............................................................. 360/113
[58] Field of Search ............................ 360/113, 119, 360/121–126

[56] References Cited

U.S. PATENT DOCUMENTS

| | | | |
|---|---|---|---|
| 3,887,945 | 6/1975 | Nepela et al. | 360/113 |
| 3,908,194 | 9/1975 | Romankiw | 360/113 |
| 4,504,880 | 3/1985 | Church et al. | 360/113 |
| 4,550,353 | 10/1985 | Hirai et al. | 360/125 |
| 4,749,439 | 6/1988 | Kobayashi et al. | 156/645 |
| 4,803,580 | 2/1989 | Mowry | 360/113 |
| 4,841,624 | 6/1989 | Togawa et al. | 29/603 |
| 4,881,143 | 11/1989 | Bhayyacharyya et al. | 360/113 |
| 4,967,298 | 10/1990 | Mowry | 360/113 |
| 5,255,141 | 10/1993 | Valstyn et al. | 360/113 |
| 5,264,980 | 11/1993 | Mowry et al. | 360/113 |
| 5,452,164 | 9/1995 | Cole et al. | 360/113 |

FOREIGN PATENT DOCUMENTS

0 414 976 A2  11/1989  European Pat. Off. .

*Primary Examiner*—Allen T. Cao
*Attorney, Agent, or Firm*—Gray Cary Ware Freidenrich

[57] ABSTRACT

An improved method of manufacturing is provided for making an improved merged MR head. The method employs a photoresist mask with appropriately-sized openings for simultaneously etching numerous vias to various depths over a set time period. After formation of the vias, a single photoresist mask is employed to pattern in one step gap layers G3, G2, G1 and a first shield layer S1 to the desired lateral configuration for the merged MR head. Subsequent to patterning these thin film layers, double insulation layers I2 and I3 are individually soft baked on top of the coil structure of the head followed by patterning of the layers I2/I3 by a single photoresist mask. These layers are then hard baked to retain the desired smooth configuration of the layers. The improved merged MR head has a smooth configuration to its top pole piece P2 because of the smooth configuration of the I2/I3 layer so that flux leakage and saturation problems are minimized.

13 Claims, 6 Drawing Sheets

SIMPLIFIED MAGNETIC HEAD WITH COMMON WRITE GAP/FIRST INSULATION LAYER

CROSS REFERENCE TO RELATED APPLICATION

This application is a division of application Ser. No. 08/474,645 filed Jun. 7, 1995, now U.S. Pat. No. 5,779,923, which is a division of Ser. No. 08/205,006 now U.S. Pat. No. 5,435,053 filed on Mar. 2, 1994 and issued on Jul. 25, 1995.

BACKGROUND OF THE INVENTION

1. Field of the Invention

The present invention includes a method of making a merged magnetoresistive ("MR") head.

2. Description of the Related Art

A merged MR head includes an integrated read/write structure that incorporates a thin film write element with first and second pole layers (P1 and P2) separated by a transducing gap, and a magnetoresistive (MR) read element with first and second shields (S1 and S2).

A conventional merged MR head employs a single S2/P1 layer which serves a dual function: (1) provision of a second shield layer S2 for the read element and (2) provision of a first pole layer P1 for the write element. By employing the dual function S2/P1 layer, several steps are saved in the process of making the merged MR head.

Even though several process steps are saved by employing the dual function S2/P1 layer, the prior art method of manufacturing a merged MR head requires numerous process steps. For example, one method known to the inventors requires 25 photoresist masks. Each masking operation requires several processing steps. Consequently, the cost of manufacturing the prior art merged MR head is quite expensive. Further, the prior art method of manufacturing produces a head which has an irregular zero throat level and poorly planarized insulation layers for the coil of the write head, and presents a high risk of contamination of the MR stripe.

SUMMARY OF THE INVENTION

The present invention provides a simplified method of making a merged MR head. The head produced by this method has a well-formed zero throat level and a highly planarized insulation layer for the coil of the write head. The simplified method of making the head requires approximately 15 photoresist masks, which is 10 less than the prior art method of manufacturing. This has been accomplished by incorporation of unique steps into the making of the merged MR head. One novel step is to simultaneously etch all head vias with a single photoresist mask. Another unique step is to simultaneously pattern the gap layers G3, G2, and G1 and the first shield layer S1 simultaneously with a single photoresist mask. Still another unique step is to form a single insulation layer with a single photoresist mask, consequently requiring only one step of hard baking to protect the coil of the write head.

An object of the present invention is to provide a simplified method of making a merged MR head.

Another object is to provide a method of making a merged MR head which requires fewer photoresist masks than the prior art method of manufacturing.

A further object is to provide a method of manufacturing a merged MR head wherein all head vias can be simultaneously etched with a single photoresist mask.

Still another object is to provide an improved method of manufacturing a merged MR head wherein the gap layer G3 of the write element and the gap layers G2 and G1 and the first shield layer S1 of the read element can be simultaneously patterned with one photoresist mask.

Still a further object is to provide a method of manufacturing a merged MR head wherein a single insulation layer can be formed with a single photoresist mask and hard baked once to protect the coil of the write head.

Still another object is to accomplish any combination of the foregoing three objects set forth hereinabove.

Still a further object is to provide a merged MR head which has an improved zero throat level area and an improved planarization of the insulation layer which protects the coil of the write head.

Other objects and advantages will become apparent when considered in light of the following description of the invention.

DESCRIPTION OF THE PREFERRED EMBODIMENTS

Figure 1:
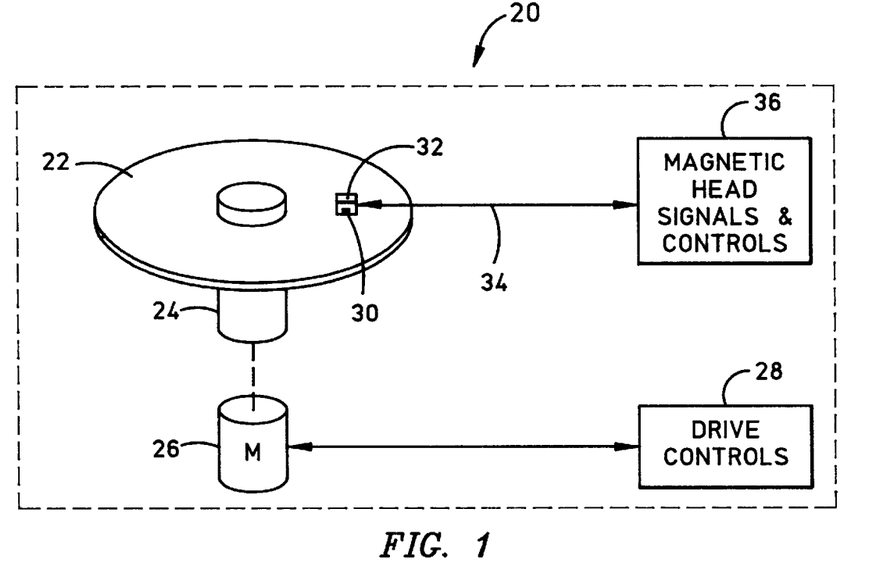
FIG. 1 is an exemplary magnetic media drive which employs a merged MR head.

Referring now to the drawings, wherein like reference numerals designate like or similar parts throughout the several views, there is illustrated in FIG. 1 a magnetic disk drive 20 which includes a rotating magnetic disk 22. The disk 22 is supported by a spindle 24 which is rotated by a motor 26, the motor 26 being controlled by drive controls 28. A thin film merged MR head 30 is mounted on a slider 32 which in turn is supported by a suspension 34. The signals to and from the magnetic head 30 and its movements with respect to the magnetic disk 22 are controlled by magnetic head signals and controls 36. When the disk 22 is rotated, the slider 32 rides on a cushion of air (air bearing) which is generated by the movement of the disk 22. During the movement of the disk 22, the head 30 is in a transducing relationship with respect to one of a plurality of information-carrying circular tracks (not shown) on the disk. The bottom surfaces of the slider 32 and the merged MR head 30 are in a plane, called an air bearing surface (ABS), that faces a surface of the disk 22. The ABS is spaced from the surface of the disk 22 by a distance in the order of 0.075 μm when the disk is rotating. The above components of the drive are mounted within a housing 38.

Figure 2:
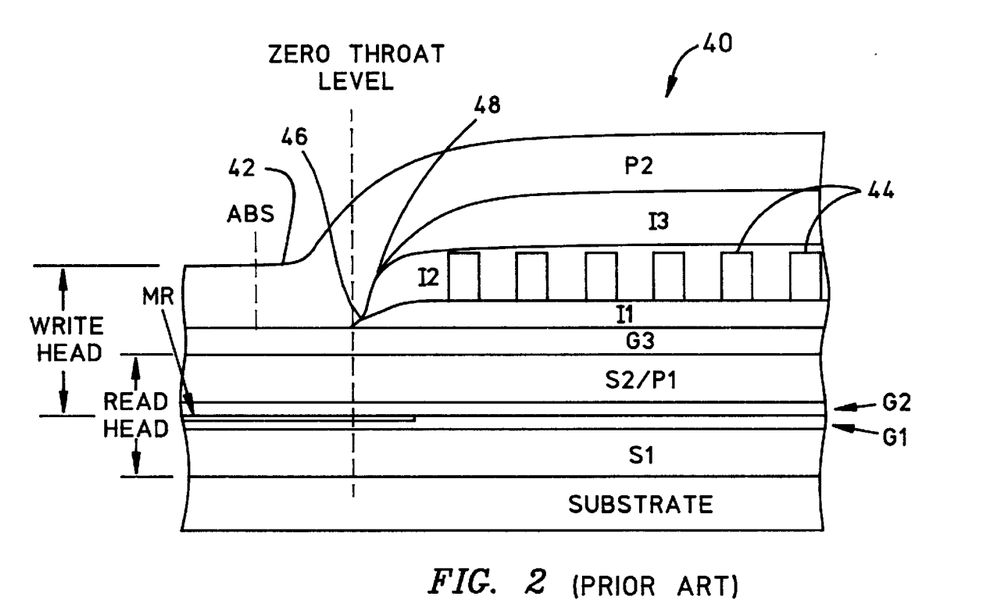
FIG. 2 is a side cross-sectional view of a prior art merged MR head.

FIG. 2 illustrates a prior art merged MR head 40. This head includes a magnetoresistive stripe MR which is sandwiched between first and second gap layers G1 and G2. The gap layers G1 and G2 are sandwiched between first and second shield layers S1 and S2, the first shield layer S1 being mounted on a substrate. The foregoing elements comprise an MR read element. The write element includes a third gap layer G3 which is located between a bottom pole piece P1 and a top pole piece P2. The pole pieces P1 and P2 have forward extensions which form a pole tip 42, the gap layer G3 being sandwiched between the pole pieces P1 and P2 in the pole tip region. On top of the third gap layer G3 is a first insulation layer I1. On top of the insulation layer I1 is a coil structure 44. Within the coil structure 44 and on top thereof is a second insulation layer I2. On top of the insulation layer I2 is a third insulation layer I3. It is important to note that the bottom pole piece P1 of the write element comprises the second shield layer S2 of the read head. Accordingly, this layer is commonly referred to as the S2/P1 layer. It functions as a second shield layer for the MR stripe when the read element is performing a read function and it serves as the bottom pole P1 for the write element when the element is writing.

In the prior art, the first insulation I1 is used for distancing the coil structure 44 from the S2/P1 layer. This first insulation layer is formed by the steps of deposition, photo patterning, and hard baking. The second and third insulation layers I2 and I3 are used for planarizing the head structure prior to forming the top pole piece P2. The insulation layer I2 is laid within and on top of the coil structure 44 by deposition, photo patterning, and hard baking. After this step, there is still considerable rippling in the top surface of the I2 layer due to the up-and-down topography of the coil structure 44. In order to further smooth out this rippling and planarize the head structure, the third insulation layer I3 is formed by deposition, photo patterning, and hard baking. The formation of the insulation layers I1, I2, and I3 requires many steps and is time-consuming. Even with this effort, the planarization of the head structure prior to forming the top pole piece P2 is difficult. Further, the insulation layers I1, I2, and I3 have abrupt changes in their topography at 46 and 48 near the zero throat level. This abrupt topography is caused by the separate photo patterning of the completed insulation layers I1, I2, and I3. The top pole piece P2 is formed on top of the insulation layers I1, I2, and I3 which causes it to take on the same abrupt topography as the insulation layers near the zero throat level. Consequently, flux flow through the top pole piece P2 is abruptly changed in direction as it flows to the pole tip region of the write element. These abrupt changes characteristically result in flux leakage and/or saturation. It would be highly desirable if the insulation layers I1, I2, and I3 would form a smooth configuration as they join together and approach the zero throat level of the write element.

Figure 3:
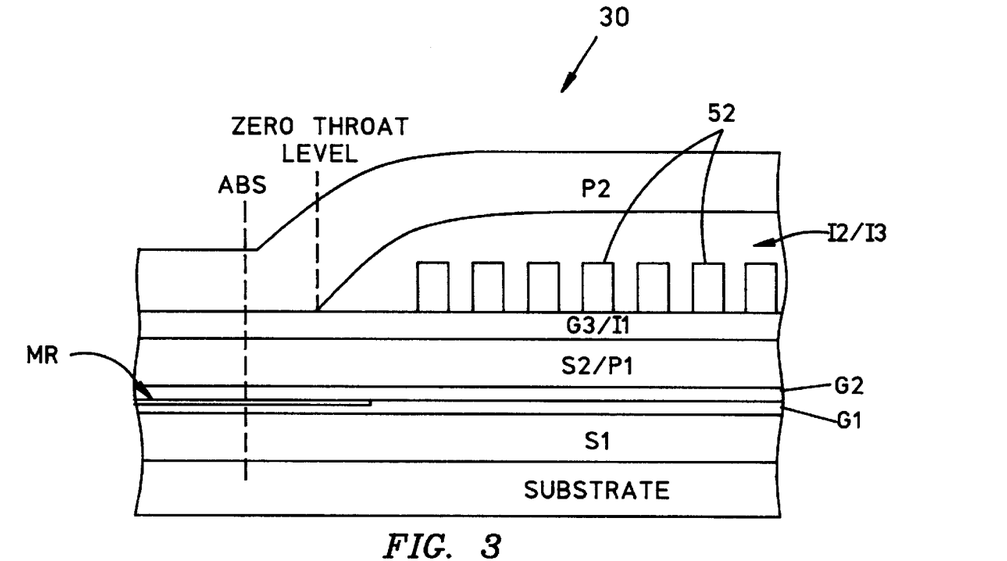
FIG. 3 is a side cross-sectional view of the merged MR head of this invention.
Figure 4:
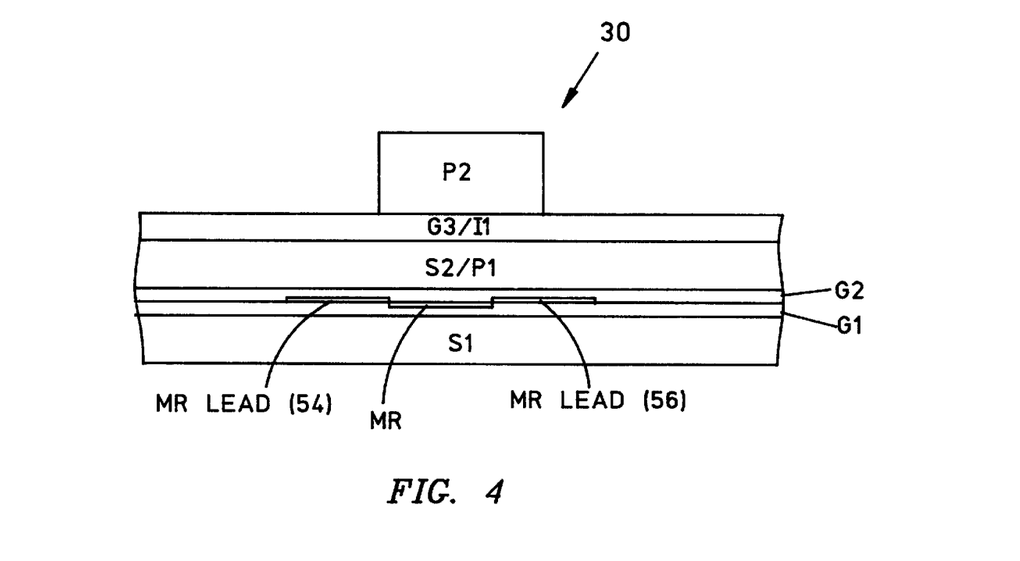
FIG. 4 is an ABS view of the merged MR head of FIG. 3.

The present merged MR head is illustrated at 30 in FIGS. 3 and 4. This merged MR head 30 includes an MR stripe which is sandwiched between first and second gap layers G1 and G2. The gap layers G1 and G2 are sandwiched between first and second shield layers S1 and S2, the first shield layer S1 being mounted on a substrate. These elements form the read head portion of the merged MR head 30. The write element of the merged MR head 30 includes a third gap layer G3 which is located between bottom and top pole pieces P1 and P2. The second shield layer S2 also serves as the bottom pole P1 so that this layer is commonly referred to as the S2/P1 layer. The bottom and top pole pieces P1 and P2 have extensions which form a pole tip structure between an ABS and a zero throat level. The gap layer G3 is sandwiched between these forward extensions in the pole tip region. A coil structure 52 is located between the third gap layer G3 and the top pole piece P2. In the present merged MR head 30, the coil structure 52 is formed directly on the third gap layer G3 so that the third gap layer G3 also functions as a first insulation layer I1. This is one of the differences between the present head 30 and the prior art head 40. It has been found that the third gap layer G3 has a sufficient thickness to distance the coil structure 52 from the S2/P1 layer. Another difference of the present head 30 over the prior art head 40 is that only one hard baked insulation layer, referred to as I2/I3, is located between the third gap layer G3 and the top pole piece P2 about the coil structure 52. As will be explained hereinafter, this single insulation layer I2/I3 is formed by soft baking two insulation layers, photo patterning the insulation layers, and then hard baking them. This results in a smooth merged configuration of the hard baked insulation layers to the zero throat level. When the top pole piece P2 is formed on top of the insulation layer I2/I3, the zero throat level is accurately located where the top pole piece P2 abruptly changes direction into the pole tip region. This means that the flux will change direction at the zero throat level, not before, which is the desired condition. FIG. 4 illustrates the MR stripe being connected to MR leads 54 and 56.

Figure 6:
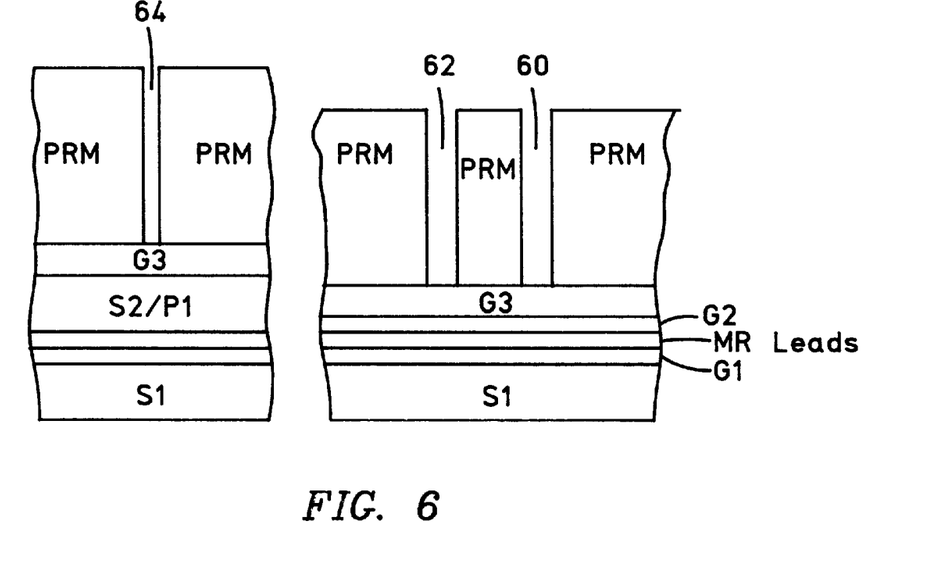
FIG. 6 is a cross-sectional view of the process step employing a single photoresist mask to simultaneously etch vias with two of the outside photoresist mask openings 60 and 62 shown out of position to illustrate the details thereof.
Figure 7:
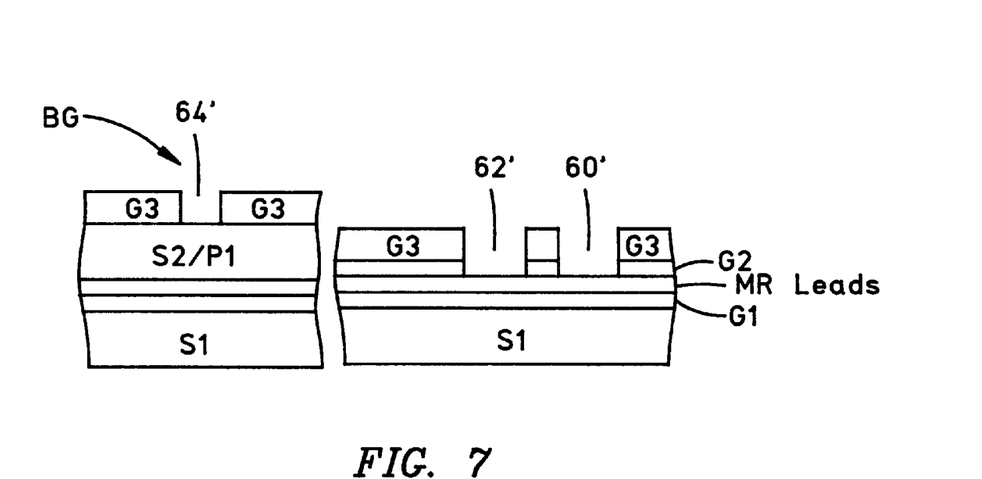
FIG. 7 is similar to FIG. 6 except the vias have been etched and the photoresist mask has been removed.

The process of the present invention differs significantly from the prior art method by simultaneously etching all vias with a single photoresist mask. As shown in FIG. 6, the photoresist mask (PRM) has openings 60, 62, and 64. In FIG. 7, vias are shown at 60', 62', and 64'. The vias 60' and 62' are holes through the third and second gap layers G3 and G2 to the MR leads and, in a later manufacturing step, are filled with a conductive material, such as copper, for connection to studs (not shown). The via 64' is a hole through the third gap layer G3 to the S2/P1 layer that provides a back gap (BG) connection between the bottom and top poles P1 and P2 after deposition of the P2 layer.

In order to accomplish the simultaneous fabrication of the vias 60', 62', and 64', a single photoresist mask (PRM) with appropriately sized openings 60, 62, and 64, as illustrated in FIG. 6, is employed. The patterning of the S2/P1 layer provides a configuration which forms the shape for the bottom pole P1. As can be seen from FIG. 6, the patterning of the S2/P1 layer has removed this layer in the area of the metallic MR leads so that an etchant can etch through the alumina gap layers G3 and G2 to the MR leads. Since the S2/P1 layer is left in the area of the back gap via 64, only the third gap layer G3 will be etched by the etchant to the metallic S2/P1 layer.

The size of the lateral areas of the MR vias 60 and 62 is constrained by the area of overlap between the MR leads with respect to the connecting leads (not shown). The size of the area of the back gap via 64 is constrained by the coil that spirals therearound (see FIG. 10). Since all of the vias are simultaneously etched, it is important that the lateral opening of the via 64' not be overetched beyond its constrained size with respect to the vias 62' and 64'. In this regard, it is important to remember than an etchant will etch laterally as well as vertically. Since the vias 60' and 62' have to be etched through two gap layers, namely, G3 and G2, they will take the longest time. The shortest time will be for the via 64' where the etchant is required only to etch through the third gap layer G3. Accordingly, if the opening 64 in the photoresist mask for the via 64' is made a size based on the time to etch through only G3, the via 64' will be overetched laterally beyond the desired constrained size. This is because the etchant will etch to the S2/P1 layer for the via 64' before the etchant etches to the MR leads for the vias 60' and 62'. Accordingly, the opening 64 in the photoresist mask will have to be appropriately smaller for the via 64' since the etchant will continue to etch laterally waiting for the etchant to etch through the layers for the vias 60' and 62'. This difference in size is referred to as "windage", which is the overetch of vias which are going to a lesser depth than other vias. Windage is therefore applied to the via 64' making the opening 64 in the photoresist mask smaller than it would be just to etch through G3. The adjustment is based on how long it takes the etchant to etch through both G3 and G2. The openings 60 and 62 in the photoresist mask are simply based on the time that it takes for the etchant to etch through G3 and G2. A common etchant is employed which will etch the alumina gap layers G3 and G2 and will not etch the metallic MR and S2/P1 layers.

Figure 5:
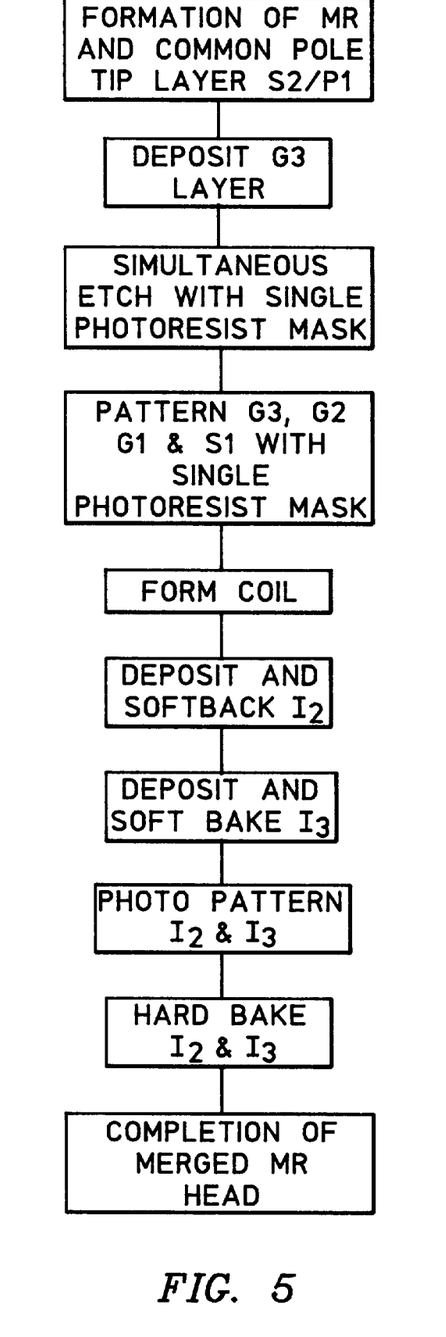
FIG. 5 is a block diagram of the process steps involved in making the merged MR head of FIG. 3.

The next step shown in FIG. 5 is to simultaneously pattern the gap layer G3, G2, and G1 and the first shield layer S1. This is accomplished with a single photoresist mask. An etchant which etches the alumina of the gap layers G3, G2, and G1 and the metal of the first shield layer S1 is employed. This simultaneous step saves numerous prior art steps. The next step from FIG. 5 is to form the coil 52. Frame plating is employed to form the coil on top of the third gap layer G3 above the S2/P1 layer for the bottom pole P1.

Figure 8:
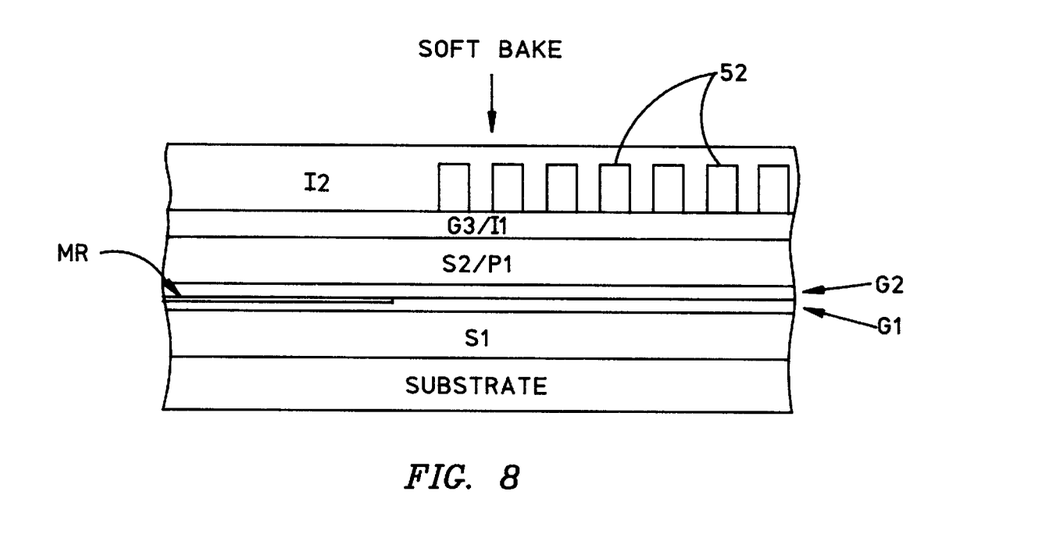
FIG. 8 illustrates the first soft bake of the insulation layer I2 for the coil of the write element.
Figure 9:
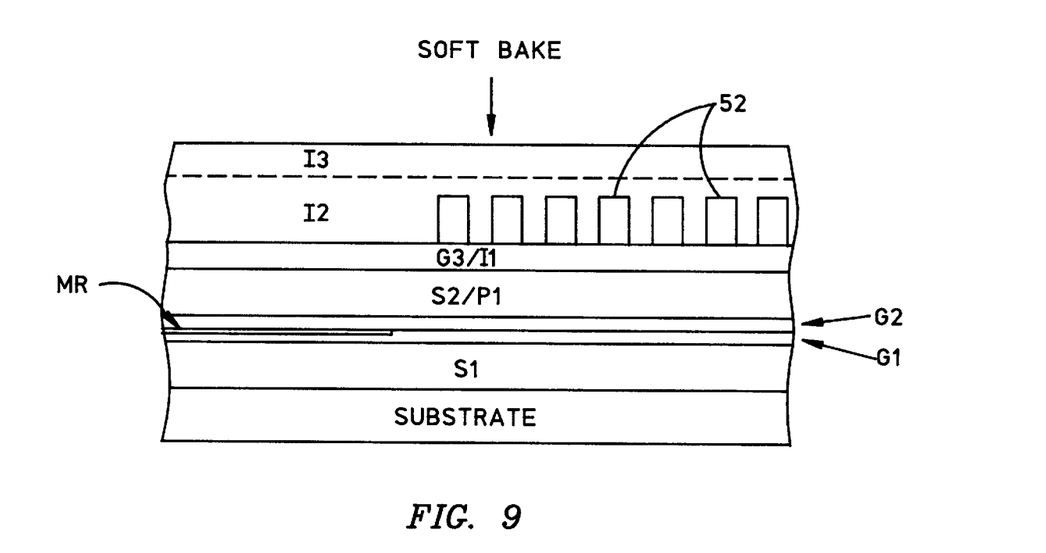
FIG. 9 is a second soft bake the insulation layer I3 for the protection of the coil of the merged MR head.
Figure 10:
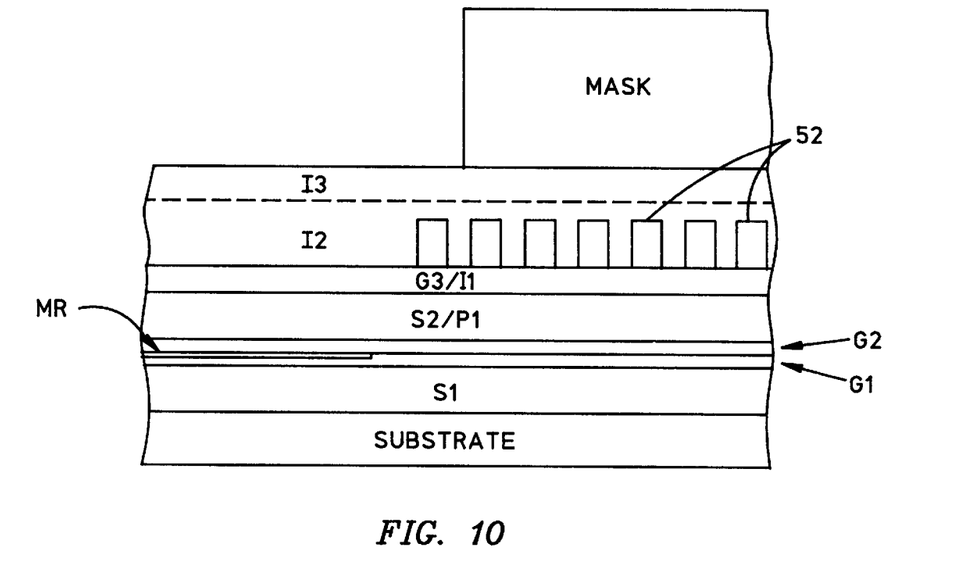
FIG. 10 illustrates the placement of a photoresist mask for the patterning of the layer for the coil of the merged MR head.
Figure 11:
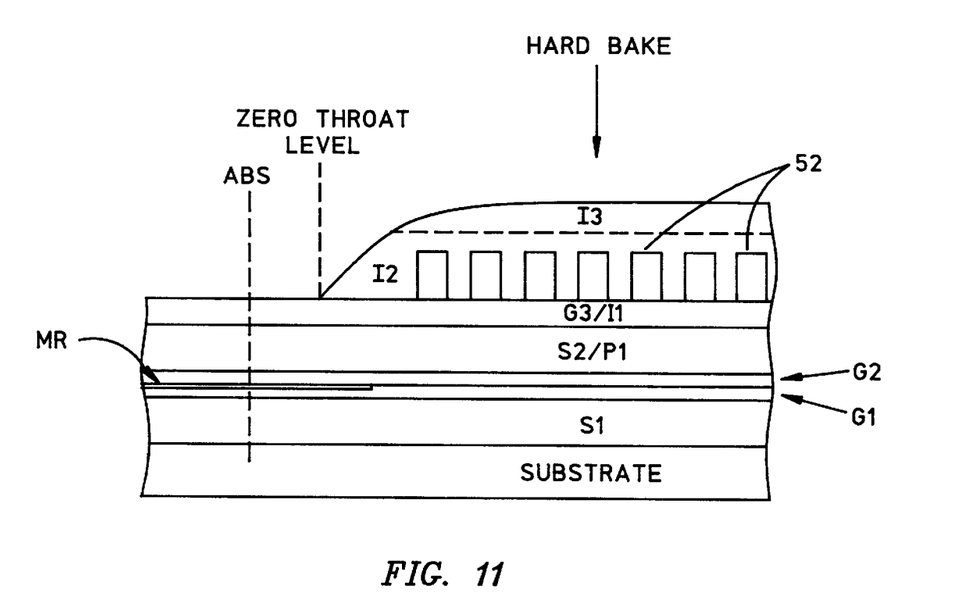
FIG. 11 illustrates a hard bake step to complete the insulation layers I2/I3 for the coil of the write element.

The next step from FIG. 5 is to deposit insulation layers about the coil structure which involves a sequence of steps as illustrated in FIGS. 8–11. As shown in FIG. 5, the first step is to deposit and soft bake a second insulation layer I2. This is shown in FIG. 8, where the insulation layer I2 is deposited directly on and slightly above the coil structure 52. After the insulation layer I2 is deposited, it is soft baked at a temperature of approximately 92° C. to 95° C. for approximately 30 minutes. Next, FIG. 5 shows that a third insulation layer I3 is deposited and soft baked. This is illustrated in FIG. 9. The importance of two depositions and two soft bakes is that this process highly planarizes the insulation layers for the top pole piece P2 which will be subsequently formed. Next FIG. 5 shows that the I2 and I3 layers are photo patterned to provide the desired shape. This is shown in FIGS. 10 and 11 of the drawings. A photoresist mask is patterned on top of the I2/I3 layer and these layers are etched to provide the smooth configuration shown in FIG. 11. This smooth configuration of the I2/I3 layers slopes down to the zero throat level so that the zero throat level can be accurately placed within the head. The next step shown in FIG. 5 is a step of hard baking the I2/I3 layers which can be at a temperature of approximately 240° C. for a total of approximately 17 hours. The next step, as shown in FIG. 5, is to deposit the top pole piece P2 which is followed by various steps of patterning the top pole layer to the desired configuration. The completed head with the top pole piece P2 is illustrated in FIG. 3. It can be seen that the top pole piece P2 slopes gradually down to the zero throat level because of the smooth configuration of the I2/I3 layers to establish a well-formed and well-placed zero throat level. Further, because of the smooth configuration of the top pole piece P2, flux will flow smoothly without flux leakage or saturation problems. The head is usually then provided with an overcoat (not shown) and lapped to the ABS as shown in FIG. 3 to complete the merged MR head 30.

It is now readily apparent that the present invention provides a simplified manufacturing process for making a merged MR head. The simplified process eliminates many of the masking steps required by the prior art method of manufacture. The present head has an improved zero throat level and better-shaped top pole piece P2. The method of manufacturing holds off patterning the gap layers G3, G2, and G1 and the first shield layer S1 until after the formation of the vias. This keeps the wafer in a planarized state for better construction up to that point and also protects the MR stripe from contamination by the earlier patterning steps of the prior art method. Further, the simultaneous patterning of all these thin film layers eliminates numerous masking steps which were required by the prior art method. The same holds true for the simultaneous formation of all of the vias. A single photoresist mask is used, after which a single etchant step is employed thereby eliminating many of the masking steps of the prior art method. Numerous masking steps are also eliminated by the construction of the I2/I3 insulation layers for protection of the coil structure 52. A single photoresist mask is employed, and two soft bakes are implemented followed by a hard bake. These steps result in a highly desirable planarization of these insulation layers. Accordingly, the invention accomplishes two broad purposes, namely: (1) the elimination of many process steps over the prior art method of manufacture, and (2) the production of a significantly improved merged MR head.

Obviously many modifications and variations of the present invention are possible in light of the above teachings. It is therefore to be understood that, within the scope of the appended claims, the invention may be practiced other than as specifically described.

We claim:

1. A merged MR head comprising:

an MR stripe and conductor leads sandwiched between first and second gap layers G1 and G2;

the gap layers G1 and G2 being sandwiched between first and second shield layers S1 and S2;

a coil located between bottom and top pole pieces P1 and P2, the pole piece P1 having been formed by patterning the second shield layer S2;

a third gap layer G3 being located between the bottom and top pole pieces P1 and P2;

the coil being located directly on top of the third gap layer G3 so that the third gap layer G3 functions as a first insulation layer I1 for the coil; and one or more insulation layers on top of the coil.

2. A merged MR head comprising:

an MR stripe and conductor leads sandwiched between first and second gap layers G1 and G2;

the gap layers G1 and G2 being sandwiched between first and second shield layers S1 and S2;

pole pieces P1 and P2 being connected at a back gap BG, the pole piece P1 comprising the second shield layer S2;

a third gap layer G3 being located between the bottom and top pole pieces P1 and P2;

a first via through the third gap layer G3 for the back gap;

a second via through the third and second gap layers G3 and G2 to one of the MR leads and a third via through the third and second gap layers G3 and G2 to the other MR lead; and the first, second, and third vias having been formed by simultaneous etching.

3. A merged MR head as claimed in claim 2 including:
said vias having been etched employing a single photoresist mask with openings corresponding to the vias;
each of said vias having a depth;
the depth of the first via being less than the depth of the second and third vias.

4. A merged MR head comprising:
a MR stripe and conductor leads sandwiched between first and second gap layers G1 and G2;
the gap layers G1 and G2 being sandwiched between first and second shield layers S1 and S2;
a coil layer located between bottom and top pole pieces P1 and P2, the pole piece P1 having been formed by patterning the second shield layer S2;
a third gap layer G3 having a first portion located between the bottom and top pole pieces P1 and P2; and
the third gap layer G3 having a second portion that is the only layer located between the bottom pole piece and the coil.

5. A magnetic head having a yoke region that is located between a pole tip region and a back gap region, the pole tip region terminating at an air bearing surface (ABS), the magnetic head comprising:
first and second pole piece layers, each pole piece layer having a yoke portion located in the yoke region, a pole tip portion located in the pole tip region and a back gap portion located in the back gap region wherein the yoke portion is located between the pole tip portion and the back gap portion;
the pole tip portions of the pole piece layers terminating at the ABS and the back gap portions of the pole piece layers being magnetically coupled;
a portion of a coil layer located between the yoke portions of the first and second pole piece layers for inducing a magnetic field into the first and second pole piece layers;
a magnetic insulative gap layer G3 having a first portion sandwiched between the pole tip portions of the first and second pole piece layers and terminating at the ABS for enabling fringing flux transfer between the pole tip portions at the ABS;
said gap layer G3 having a second portion extending from the pole tip region into the yoke region so as to have a yoke portion that is located directly on the second pole piece layer between the yoke portions of the first and second pole piece layers;
said portion of the coil layer being located directly on the gap layer G3 with no insulation layer between the gap layer G3 and the coil layer so that the gap layer G3 functions as a first insulation layer I1 for said portion of the coil layer and is the only insulation layer between the first pole piece layer and said portion of the coil layer; and
one or more additional insulation layers located between said portion of the coil layer and the yoke portion of the second pole piece layer.

6. A magnetic head as claimed in claim 5 wherein said gap layer G3 interfacially engages each of the first pole piece layer and said portion of the coil layer.

7. A magnetic head as claimed in claim 5 including:
a magnetoresistive (MR) sensor and conductor leads, the conductor leads being connected to the MR sensor;
first and second gap layers G1 and G2;
the MR sensor and the conductor leads being sandwiched between the first and second gap layers G1 and G2;
a first shield layer S1;
the first and second gap layers G1 and G2 being sandwiched between the first shield layer S1 and the pole tip portion of the first pole piece layer so that the pole tip portion of the first pole piece layer functions as a second shield layer S2 for the MR sensor; and
the MR sensor, the first and second gap layers G1 and G2, the first shield layer S1 and the pole tip portion of the first pole piece layer having edges which form a portion of said ABS.

8. A magnetic head as claimed in claim 7 wherein said gap layer G3 interfacially engages each of the first pole piece layer and said portion of the coil layer.

9. A magnetic head as claimed in claim 8 wherein the first shield layer S1, the first and second gap layers G1 and G2 and the gap layer G3 have the same shape having been formed simultaneously with common formation steps.

10. A magnetic disk drive comprising:
a write head having a yoke region that is located between a pole tip region and a back gap region, the pole tip region terminating at an air bearing surface (ABS);
the write head including:
first and second pole piece layers, each pole piece layer having a yoke portion located in the yoke region, a pole tip portion located in the pole tip region and a back gap portion located in the back gap region wherein the yoke portion is located between the pole tip portion and the back gap portion;
the pole tip portions of the pole piece layers terminating at the ABS and the back gap portions of the pole piece layers being magnetically coupled;
a portion of a coil layer located between the yoke portions of the first and second pole piece layers for inducing a magnetic field into the first and second pole piece layers;
a magnetic insulative gap layer G3 having a first portion sandwiched between the pole tip portions of the first and second pole piece layers and terminating at the ABS for enabling fringing flux transfer between the pole tip portions at the ABS;
said gap layer G3 having a second portion extending from the pole tip region into the yoke region so as to have a yoke portion that is located directly on the second pole piece layer between the yoke portions of the first and second pole piece layers;
said portion of the coil layer being located on the gap layer G3 with no insulation layer between the gap layer G3 and the coil layer so that the gap layer G3 functions as a first insulation layer I1 for said portion of the coil layer and is the only insulation layer between the first pole piece layer and said portion of the coil layer; and
one or more additional insulation layers located between said portion of the coil layer and the yoke portion of the second pole piece layer;
a read heading including:
a magnetoresistive (MR) sensor and conductor leads, the conductor leads being connected to the MR sensor;
first and second gap layers G1 and G2;
the MR sensor and the conductor leads being sandwiched between the first and second gap layers G1 and G2;
a first shield layer S1;
the first and second gap layers G1 and G2 being sandwiched between the first shield layer S1 and the pole tip portion of the first pole piece layer so that the pole tip portion of the first pole piece layer functions as a second shield layer S2 for the MR sensor; and the MR sensor, the first and second gap layers G1 and G2, the first shield layer S1 and the pole tip portion of the first pole piece layer having edges which form a portion of said ABS;

sense current source means for applying a sense current through the sensor;

the write head and the read head forming a combined magnetic head;

a frame;

a magnetic disk rotatably supported on the frame;

a support mounted on the frame for supporting the head in a transducing relationship with the magnetic disk;

means for rotating the magnetic disk;

positioning means connected to the support for moving the combined magnetic head to multiple positions with respect to said magnetic disk; and means connected to the combined magnetic head to the means for rotating the magnetic disk and to the positioning means for exchanging signals with the combined magnetic head for controlling movement of the magnetic disk and for controlling the position of the combined magnetic head.

11. A magnetic head as claimed in claim 10 wherein said gap layer G3 interfacially engages each of the first pole piece layer and said portion of the coil layer.

12. A magnetic head as claimed in claim 11 wherein the first shield layer S1, the first and second gap layers G1 and G2 and the gap layer G3 have the same shape having been formed simultaneously with common formation steps.

13. A magnetic media drive comprising:

a merged magnetoresistive (MR) head that includes:

an MR stripe and conductor leads sandwiched between first and second gap layers G1 and G2;

the gap layers G1 and G2 being sandwiched between first and second shield layers S1 and S2;

a coil located between bottom and top pole pieces P1 and P2, the pole piece P1 having been formed by patterning the second shield layer S2;

a third gap layer G3 being located between the bottom and top pole pieces P1 and P2;

the coil being located directly on top of the third gap layer G3 so that the third gap layer G3 functions as a first insulation layer I1 for the coil; and one or more insulation layers on top of the coil;

a housing;

means located within the housing for moving magnetic media; and means for supporting the merged MR head within the housing in a transducing relationship with respect to moving magnetic media.

* * * * *